US008640857B2

(12) United States Patent
Marchesini et al.

(10) Patent No.: US 8,640,857 B2
(45) Date of Patent: Feb. 4, 2014

(54) ADJUSTABLE LOADING/UNLOADING MOUTH

(75) Inventors: Vainer Marchesini, San Prospero (IT); Daniele Pancaldi, Carpi (IT)

(73) Assignee: WAM Industriale S.p.A., Modena (IT)

( * ) Notice: Subject to any disclaimer, the term of this patent is extended or adjusted under 35 U.S.C. 154(b) by 572 days.

(21) Appl. No.: 12/745,446

(22) PCT Filed: Dec. 4, 2007

(86) PCT No.: PCT/IT2007/000846
§ 371 (c)(1),
(2), (4) Date: May 28, 2010

(87) PCT Pub. No.: WO2009/072151
PCT Pub. Date: Jun. 11, 2009

(65) Prior Publication Data
US 2010/0300846 A1    Dec. 2, 2010

(51) Int. Cl.
*B65G 33/12* (2006.01)
*B65G 33/00* (2006.01)
(52) U.S. Cl.
CPC ..................................... *B65G 33/00* (2013.01)
USPC ........................................... 198/658; 285/261
(58) Field of Classification Search
USPC ............... 198/658, 671; 285/261, 146.1, 263, 285/271, 184, 185
See application file for complete search history.

(56) References Cited

U.S. PATENT DOCUMENTS

| | | | |
|---|---|---|---|
| 1,125,642 A * | 1/1915 | Blanchard | 285/89 |
| 1,605,507 A * | 11/1926 | Burke | 285/98 |
| 1,957,409 A * | 5/1934 | Lower | 198/661 |
| 2,323,553 A * | 7/1943 | Martin | 198/661 |
| 2,489,100 A * | 11/1949 | Marco | 285/184 |
| 2,585,169 A * | 2/1952 | Potter | 414/505 |
| 3,391,778 A * | 7/1968 | Lasiter | 198/530 |
| 3,762,746 A * | 10/1973 | Amada | 285/184 |
| 4,776,617 A | 10/1988 | Sato | |
| 4,781,405 A * | 11/1988 | Peaster | 285/148.27 |
| 4,988,240 A * | 1/1991 | Thompson | 406/166 |
| 5,927,758 A * | 7/1999 | Carlsson | 285/7 |
| 6,561,549 B1 | 5/2003 | Moris et al. | |
| 7,699,355 B2 * | 4/2010 | Vitel et al. | 285/184 |
| 7,850,209 B2 * | 12/2010 | Lutzer et al. | 285/281 |
| 2010/0171303 A1* | 7/2010 | Krausz et al. | 285/184 |

FOREIGN PATENT DOCUMENTS

| | | |
|---|---|---|
| EP | 0 060 816 A1 | 9/1982 |
| FR | 1088497 | 3/1955 |
| GB | 732146 | 6/1955 |

* cited by examiner

*Primary Examiner* — William R Harp
(74) *Attorney, Agent, or Firm* — Pearne & Gordon LLP

(57) ABSTRACT

An adjustable loading/unloading mouth, including: a first tubular element (2), provided with a longitudinal axis (x); a second tubular element (3), provided with a longitudinal axis (y); connecting elements (4, 5, 6) between the first and the second tubular element (2, 3) which connecting elements (4, 5, 6) define a spherical surface (S), provided with a center (O), and which enable the first and the second tubular element (2, 3) to rotate with respect to one another about the center (O); wherein the connecting elements (4, 5, 6) include at least a first connecting element (4) and at least a second connecting element (5) which are reciprocally connectable at a joining plane (P) passing through the center (O) of the spherical surface (S) on which the first connecting element (4) and the second connecting element (5) can rotate with respect to one another about the center (O).

12 Claims, 2 Drawing Sheets

ADJUSTABLE LOADING/UNLOADING MOUTH

TECHNICAL FIELD

The invention relates to an adjustable loading/unloading mouth.

The adjustable mouth of the present invention is particularly useful for supplying and/or unloading an archimedes screw.

BACKGROUND ART

The prior art comprises adjustable mouths, known also as universal mouths, which can be adapted to the casing of an archimedes screw, a mixer, blender, extractor, hopper or the like, independently of the angle of inclination at which the conveyor is located in space.

An adjustable mouth of known type comprises a first portion and a second portion which are coupled to one another such that an appendage of the second portion is positioned internally of an appendage of the first portion. The appendage of the first portion is spherical. The appendage of the second portion occupies the whole orifice offered by the appendage of the first portion and adheres to the internal surface of the appendage of the first portion, defining a spherical joint, such that the first and the second portions can be positioned with the longitudinal axes thereof inclined with respect to one another.

The adjustable mouths of known type exhibit some drawbacks.

The two portions which make up the mouth are inserted one into another by permanent plastic deformation. This type of coupling often leads to the definition of surfaces (of the two portions making up the joint) that are not perfectly spherical. This can compromise the seal between the two portions making up the joint. Further, the spherical joint which is created between the two portions always presents a part of surface which is out of reach in a painting operation, i.e. the surmounting surface of the external portion over the internal portion. This non-painted surface is almost always exposed to the outside during the adjustment stage of the joint, for the positioning of the machine in the plant, and thus is not protected in any way from atmospheric agents. The mouth is also not dismountable. A further drawback of adjustable mouths of known type is constituted by their large axial mass, as in order to enable a sufficiently large angle of inclination between the two portions the spherical surfaces have to have a large diameter.

The aim of the present invention is to provide an adjustable mouth which obviates the drawbacks in the adjustable mouths of known type.

With a same maximum reachable inclination, the adjustable mouth of the present invention exhibits a more limited mass with respect to those of the is mouths of known type. The mouth is further easily mountable and dismountable. The smaller overall mass of the mouth enables the archimedes conveyor to be arranged with a smaller inclination with respect to the horizontal, leading to a lower energy consumption in order to activate the screw. The transport of the material is therefore more efficient.

DESCRIPTION OF THE DRAWINGS

Further characteristics and advantages of the adjustable mouth of the present invention will better emerge from the detailed description that follows, made herein below with reference to the accompanying figures of the drawings, given by way of non-limiting example, and in which.

DETAILED DESCRIPTION OF THE INVENTION

Figure 1:
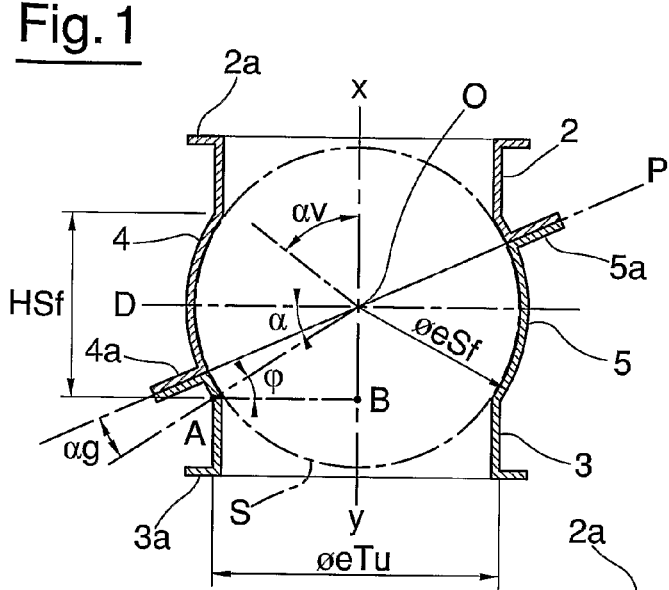
FIG. 1 is a section view of a first embodiment of the adjustable mouth of the present invention.

The adjustable mouth of the present invention comprises a first tubular element 2 provided with a longitudinal axis x, and a second tubular element 3, provided with a longitudinal axis y. The first and the second tubular elements 2, 3 are predisposed to connect to a supply or discharge opening of an operator device in general, in particular an archimedes screw, a mixer, a blender, an extractor, a hopper or other. The mouth further comprises means for connecting 4, 5, 6 between the first and the second tubular elements which define a spherical surface S which is provided with a centre O. Preferably, though not exclusively, the longitudinal axes x, y of the first and the second tubular elements intersect at the centre O. The means for connecting enable the first and the second tubular elements 2, 3 to rotate in space, one with respect to the other around the centre O.

The means for connecting 4, 5, 6 comprise at least a first connecting element 4 and at least a second connecting element 5 which are connectable to one another at a joining plane P passing through the centre O of the spherical surface S. The first and the second tubular elements 2, 3 can rotate with respect to one another about the centre O on the joining plane P. The joining plane P is diagonal with respect to the longitudinal axes x, y of the first and second tubular elements 2, 3 in an adjustable configuration of the adjustable mouth in which the longitudinal axes x, y are aligned to one another. The inclination of the joining plane P with respect to the aligned longitudinal axes x, y enables the joint to be inclined in space in a very simple way through a predetermined angle.

In a preferred embodiment of the adjustable mouth, the first connecting element 4 comprises a tubular body which defines a portion of the spherical surface S. The first connecting element 4 is preferably further provided with a coupling component, for example a flange 4a, for connecting with the second connecting element 5. Similarly the second connecting element 5 comprises a tubular body which defines a portion of the spherical surface S and is preferably provided with a coupling component, in particular a flange 5a, for connecting with the first connecting element 4. The coupling components or flanges 4a, 5a are predisposed to connect to one another at the joining plane P.

In a first embodiment of the adjustable mouth, illustrated in FIG. 1, the first connecting element 4 is solidly constrained to the first tubular element 2, while the second connecting element 5 is solidly constrained to the second tubular element 3. In the first embodiment, by rotating the first and the second connecting elements 4, 5 with respect to one another on the joining plane P, the angle of inclination between the longitudinal axis x of the first tubular is element 2 and the longitudinal axis y of the second element 3 is changed. Preferably, though not exclusively, the tubular elements 2, 3 exhibit the same internal diameter and the same external diameter.

With reference to FIG. 1, which shows a configuration of the joint in which the longitudinal axes x, y are aligned to one another, if $\alpha$ denotes the inclination of the joining plane P with respect to a diameter plane D of the spherical surface S perpendicular to the longitudinal axes x, y, the maximum possible angle of inclination αv between the longitudinal axes is:

$$\alpha v = 2\alpha$$

From a constructional point of view the greatest angle of inclination αv between the longitudinal axes x, y is comprised between about 6° and 30°. This means that in a joint in which the desired maximum angle of inclination αv is 6°, the inclination α of the joint P with respect to a diameter plane D of the spherical surface S perpendicular to the longitudinal axes x, y (the configuration of FIG. 1) is 3°. Similarly, in a joint which has to reach a maximum angle of inclination αv of 30°, the inclination α of the joining plane P with respect to a diameter plane D of the spherical surface S perpendicular to the longitudinal axes x, y is 15°.

If φ is the angle comprised between the diameter plane D and a diameter plane passing through an end A of the portion of spherical surface S defined by the first or the second connecting element 4, 5, and αg is the angle comprised between the latter diameter plane and the joining plane P, then:

$$\varphi = \alpha + \alpha g \text{ and thus } \alpha = \varphi - \alpha g$$

Considering the right-angled triangle of FIG. 1, angle φ can be expressed as $$\overline{AO} \cdot \cos\varphi = \overline{AB} \Rightarrow \varphi = \arccos\frac{\phi eTu}{\phi eSf}$$

Considering the three above expressions systematically, we obtain the value of the maximum angle of inclination αv which can be assumed by the joint as a function of the external radius φeSf of the spherical surface S, the external diameter φeTu of a tubular element and the angle αg:

$$\alpha v = 2 \cdot (\varphi - \alpha g) = 2 \cdot \left(\arccos\left(\frac{\phi eTu}{\phi eSf}\right) - \alpha g\right)$$

It is therefore possible to establish the angle of maximum inclination αv between the longitudinal axes x, y by specially dimensioning the external radius φeSf of the spherical surface S, the external diameter φeTu of a tubular element and the angle αg.

The maximum overall axial size of the first and second connecting elements 4, 5, by which is meant the maximum extension of the first second connecting elements 4, 5 together measured along the longitudinal axes x, y aligned to one another with reference to the configuration illustrated in FIG. 1, is:

$$HSf = 2 \cdot \overline{BO} = 2 \cdot \sqrt{\overline{AO}^2 - \overline{AB}^2} = \sqrt{\phi Sf^2 - \phi eTu^2}$$

where φeSf is the external radius of the spherical surface S and φeTu is the external diameter of a tubular element.

To enable an easy positioning of the adjustable mouth, the first and the second tubular elements 2, 3 are provided at free ends thereof with a connecting component, for example a flange 2a, 3a. Each flange 2a, 3a is predisposed to connect to a flange of a device to which the mouth is to be connected. The presence of the flanges 2a, 3a enables the first and the second tubular element 2, 3 to be easily rotated with respect to the device to which they are to be associated such as to arrange the longitudinal axes x, y on a determined plane. In a case in which the adjustable mouth is to be connected is to an archimedes screw, the longitudinal axes x, y can be positioned in a determined reciprocal inclination and contemporaneously the axes x, y can be arranged on a plane also containing the longitudinal axis of the archimedes screw conveyor. The flanges 2a, 3a can be provided with slots to enable connection by bolts.

Figure 2:
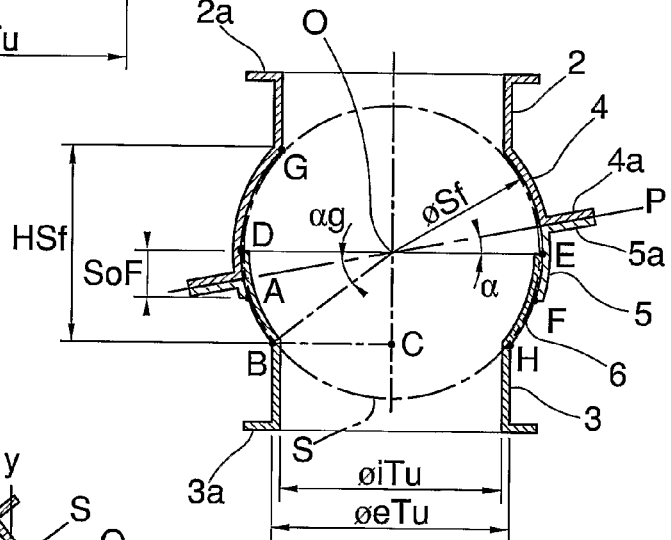
FIGS. 2 and 3 are section views of a second embodiment of the adjustable mouth according to the invention in two distinct configurations.
Figure 3:
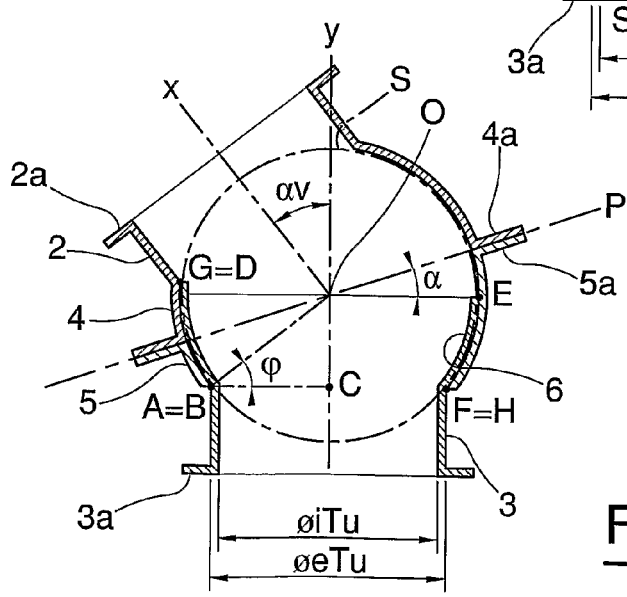
Figure 4:
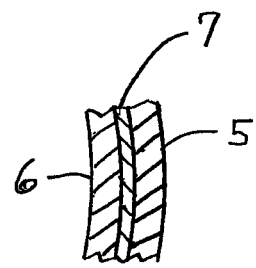
FIG. 4 is a schematic view of a sliding and sealing layer 7.

In a second embodiment of the adjustable mouth, illustrated in FIGS. 2 and 3, the means for connecting 4, 5, 6 comprise a third connecting element 6 comprising a tubular body which defines a portion of the spherical surface S and is solidly constrained to the second tubular element 3. The first, the second and the third connecting elements 4, 5, 6 are predisposed to define a spherical coupling, about the centre O of the spherical surface S, in which the third connecting element 6 is arranged internally of the first and the second connecting elements 4, 5 which are associated to one another by the respective flanges 4a, 5a. The external diameter of the third connecting element, measured with respect to the centre O, preferably coincides with the internal diameter of the first and the second connecting elements 4, 5, so that the external surface of the third connecting element 6 is contactingly slidable with respect to the first and second connecting elements 4, 5. Alternatively, a sliding and sealing layer 7 made of a suitable material can be interposed between the third connecting element and the internal surface of the first and the second connecting elements 4, 5.

The contact surface between the third connecting element 6 and the first and second connecting elements 4, 5, joined at the joining plane P, coincides with at least a portion of the spherical surface S. The first and the second connecting elements 4, 5 can thus rotate in space with respect to the third connecting element 6, about the centre O of the spherical surface S. Preferably, though not exclusively, the third connecting element 6 exhibits, at an edge of free end thereof, at least a diameter plane which lies on the diameter plane D. In this way, with reference to FIGS. 2 and 3, the third connecting element 6 is prevented from any upward displacement, i.e. directed towards the second tubular element 2. The external surface of the third connecting element 6 cannot detach from the internal surface of the first and the second connecting elements 4, 5.

FIG. 2 shows the adjustable mouth in section on a plane containing the longitudinal axes x, y in a configuration in which the longitudinal axes x, y are aligned to one another and the first tubular element 2 is positioned superiorly with respect to the second tubular element 3, although in use condition the adjustable mouth can be positioned differently with respect to how it is illustrated. A and F respectively denote a first and a second point of the lower edge of the second connecting element 5, D and E denote a first and a second point of the upper edge of the third connecting component 6 which lies on a diameter plane D; B and H denote a third and a fourth point on the lower edge of the third connecting element 6 which are at a joining zone between the third connecting element 6 and the second tubular element 3, G denotes a first point on the upper edge of the first connecting component 4 which is at a joining zone between the first connecting element 4 and the first tubular element 2.

Let us consider a rotation about the centre O of the first and second connecting elements 4, 5 in a clockwise direction. The limit to the clockwise rotation is determined in a configuration in which the first point F of the second connecting component 5 is superposed on the fourth point H of the third connection element 6, the point H being in a joining zone between the third connecting element 6 and the second tubular element 3.

By rotating the second connecting element 5 with respect to the first connecting element 4 on the joining plane P up until the first point A of the second connecting component 5 is brought to the first point F, it can be seen how the angular distance between the first point A of the second connecting element 5 and the fourth point H of the third connecting element 6 increases, such that the clockwise rotation of the first and the second connecting elements 4, 5 can be increased.

In the second embodiment of the joint, the maximum angle of inclination αv between the longitudinal axes x, y is reached in a configuration of the joint in which the first point A of the second connecting element 5 superposes on the third point B of the third connecting element 6, or when the second point E of the third connecting element 6 is superposed on the second point F of the second connecting element 5, or when the first point D of the third connecting element 6 is superposed on the first point G of the first connecting element 4.

FIG. 3 illustrates a configuration in which for a determined angle of maximum inclination αv between the longitudinal axes x, y the minimum diameter for the spherical surface S is obtained and thus the minimum size for the adjustable mouth is also obtained. This configuration obtains if the first point A of the second connecting element 5 coincides with the third point B of the third connecting component 6 and the first point D of the third connecting component 6 coincides with the first point G of the first connecting component 4.

Considering the triangle ACO of FIG. 3, the following is true:

$$\overline{AO} \cdot \cos\varphi = \overline{AC} \Rightarrow \varphi = \arccos \frac{\phi eTu}{\phi eSf}$$

$$\alpha v = 2 \cdot \alpha = \phi$$

The diameter of the spherical surface S, according to the maximum angle of inclination between the longitudinal axes x, y is thus:

$$\phi Sf = \frac{\phi eTu}{\cos \alpha v}$$

As for the development in height of the spherical surface S, the following obtains:

$$HSf = 2 \cdot \overline{AO} \cdot sen\phi = \phi eTu \cdot sen\phi$$

To increase the portion of spherical surface S at which the second connecting element 5 is in contact with the third connecting element 6, the second connecting element 5 is advantageously conformed such as to extend on a portion of the spherical surface S such that the second point F of the second connecting element 5 coincides with the fourth point H of the third connecting element 6.

In the second embodiment too, the tubular element 2, 3 can be provided with flanges 2a, 3a for connecting with corresponding flanges of the devices to which the adjustable mouth is to be associated.

The adjustable mouth of the present invention offers important advantages. The presence of the joining plane P, arranged diagonally with respect to the aligned longitudinal axes x, y, on which the first and second connecting elements 4, 5 can rotate with respect to one another, enables a very simple adjustment of the inclination between the longitudinal axes x, y of the first and the second tubular element 2, 3. The type of regulation can be obtained by an axial extension of the lower first and the second connecting element 4, 5 with respect to the axial extension of the adjustable mouths of known type. The fact that the first and the second connecting element 4, 5 are connectable to one another on the joining plane P enables easy mounting and dismounting of the adjustable mouth, differently to what is the case with the adjustable mouths of known type.

The invention claimed is:

1. An adjustable loading/unloading mouth, comprising: a first tubular element (2), provided with a first longitudinal axis (x); a second tubular element (3), provided with a second longitudinal axis (y); means for connecting (4, 5, 6) between the first and the second tubular elements (2, 3) which means for connecting (4, 5, 6) define a spherical surface (S), provided with a centre (O), and which enable the first and the second tubular elements (2, 3) to rotate with respect to one another about the centre (O); wherein the means for connecting (4, 5, 6) comprise at least a first connecting element (4) and at least a second connecting element (5) which are reciprocally connectable at a joining plane (P) passing through the centre (O) of the spherical surface (S), on which joining plane (P) the first connecting element (4) and the second connecting element (5) can rotate with respect to one another about the centre (O), the joining plane (P) being diagonal with respect to the longitudinal axes (x, y) of the first and the second tubular elements (2, 3) in a configuration of the mouth in which the longitudinal axes (x, y) are reciprocally aligned, wherein the means for connecting (4, 5, 6) comprise a third connecting element (6) comprising a tubular body which defines a portion of the spherical surface (S) and is solidly constrained to the second tubular element (3), and wherein the first, the second and the third connecting elements (4, 5, 6) are predisposed to define a spherical coupling, about the centre (O) of the spherical surface (S), wherein the first connecting element (4) comprises a first coupling component (4a), wherein the second connecting element (5) comprises a second coupling component (5a), wherein the third connecting element (6) is arranged internally of the first and the second connecting elements (4, 5) which are associated to one another at their respective coupling components (4a, 5a), wherein the second connecting element (5) has a lower edge having a first point (A) and a second point (F), and wherein the angular distance from the first point (A) to the joining plane (P) is less than the angular distance from the second point (F) to the joining plane (P).

2. The adjustable mouth of claim 1, wherein the first connecting element (4) comprises a tubular body which defines a portion of the spherical surface (S).

3. The adjustable mouth of claim 1, wherein the second connecting element (5) comprises a tubular body which defines a portion of the spherical surface (S).

4. The adjustable mouth of claim 2, wherein the second connecting element (5) comprises a tubular body which defines a portion of the spherical surface (S), and wherein the coupling components (4a, 5a) are predisposed to connect to one another at the joining plane (P).

5. The adjustable mouth of claim 1, wherein the first connecting element (4) is solidly constrained to the first tubular element (2).

6. The adjustable mouth of claim 1, wherein an external surface of the third connecting element (6) is contactingly slidable on an internal surface of the first and the second connecting elements (4, 5).

7. The adjustable mouth of claim 1, wherein a sliding and sealing layer is interposed between the third connecting element (6) and an internal surface of the first and the second connecting elements (4, 5).

8. The adjustable mouth of claim 1, wherein the longitudinal axes (x, y) of the first and the second tubular elements (2, 3) intersect one another at the centre (O) of the spherical surface (S).

9. The adjustable mouth of claim 1, wherein the first tubular element (2) is provided, at a free end thereof, with a coupling component (2a).

10. The adjustable mouth of claim 1, wherein the second tubular element (3) is provided, at a free end thereof, with a coupling component (3a).

11. The adjustable mouth of claim 1, wherein the third connecting element (6) has an upper edge having a first point (E), wherein the first tubular element (2) can be rotated with respect to the second tubular element (3) so that the upper edge of the third connecting element (6) at the first point (E) does not extend to the joining plane (P).

12. The adjustable mouth of claim 11, wherein the upper edge of the third connecting element (6) at the first point (E) does not extend to the joining plane (P) when the longitudinal axes (x, y) are parallel.

* * * * *